United States Patent
Sheng (10) Patent No.: US 6,870,647 B2
(45) Date of Patent: Mar. 22, 2005

(54) STRUCTURE OF A SCANNER CAPABLE OF ADJUSTING LIGHTNESS OF A LINE TO BE SCANNED

(75) Inventor: Thomas Sheng, Hsin-Chu (TW)

(73) Assignee: Avision Inc., Hsin-Chu (TW)

( * ) Notice: Subject to any disclaimer, the term of this patent is extended or adjusted under 35 U.S.C. 154(b) by 608 days.

(21) Appl. No.: 09/819,468

(22) Filed: Mar. 29, 2001

(65) Prior Publication Data

US 2002/0088923 A1 Jul. 11, 2002

(30) Foreign Application Priority Data

Jan. 10, 2001 (TW) .................................. 90200443 U (51) Int. Cl.$^7$ ........................ H04N 1/04; H01L 27/00; H01J 3/14
(52) U.S. Cl. .................... 358/475; 358/497; 358/474; 250/208.1; 250/234; 250/276
(58) Field of Search .................. 358/475, 497, 358/474; 250/208.1, 234, 236

(56) References Cited

U.S. PATENT DOCUMENTS

| 4,408,231 A | * | 10/1983 | Bushaw et al. ............. 358/406 |
| 4,760,609 A | * | 7/1988 | Tamagaki .................... 382/167 |
| 6,507,416 B1 | * | 1/2003 | Tang .......................... 358/475 |

* cited by examiner

Primary Examiner—Edward Coles
Assistant Examiner—Houshang Safaipour
(74) Attorney, Agent, or Firm—Charles E. Baxley (57) ABSTRACT

The invention includes at least one mechanic adjusting device between the chassis of a scanner and the light base mounted with a light tube. The adjusting device is operated to adjust the position of the light tube to change the relative position with the document to be scanned. Thus, the purpose of adjusting the lightness accepted by the line to be scanned on the document to be scanned can be achieved.

6 Claims, 12 Drawing Sheets

STRUCTURE OF A SCANNER CAPABLE OF ADJUSTING LIGHTNESS OF A LINE TO BE SCANNED

BACKGROUND OF THE INVENTION

1. Field of the Invention

The invention relates to a design of adjusting the position of the light tube of a scanner, and more particularly to a design which may adjust the relative distance between the light tube and the line to be scanned on the document to be scanned.

2. Description of the Related Art

An image capture device, such as a scanner, mainly uses light to be projected on a document, and the light after reflected or after penetrating may enter an optical reading device to proceed optical analysis. The light tube mounted on a common scanner has constant lightness and height, and the light tube of the scanner will be better if it has a greater lightness. When the lightness of the tube and the time for shifting out the charges from the CCD (charge coupled device) are properly selected for performing the low resolution scanning or black and white scanning, some problems may occur in the high resolution scanning or color scanning. Specifically, in the high resolution scanning or color scanning, due to the low capacity of the RAM (random access memory) in the scanner and the long period of time for shifting out the charges, the photo sensor in the scanner may be exposed to the light for a long period of time. Therefore, the CCD may be easily saturated in the high resolution scanning or color scanning.

For improving the above-mentioned problem of having a constant lightness, a manner of controlling the voltage or current of the light tube may be used, so that the light tube has different values of lightness according to the using conditions. However, the common scanner has a constant DC (direct current) voltage source, so that the pulse width has to be adjusted before adjusting the voltage. Thus, the ripple is easily caused, which produces noises. For eliminating the noises, complicated electronic members or circuit designs are needed to achieve the purpose. In addition, the noises cause instability of lightness of the light tube, which produces a blinking condition, thereby affecting the scanning result. The light tube is always subjected to the effect of changed voltage or current, thereby easily wearing the light tube and decreasing the lifetime of the light tube.

SUMMARY OF THE INVENTION

The invention is to provide a mechanic adjusting manner capable of adjusting the relative distance between the light tube having a constant lightness and the line to be scanned on the document. Thus, proper illumination is supplied on the document to achieve the purpose of adjusting lightness.

For achieving the above-mentioned purpose, at least one mechanic adjusting device is mounted between the chassis of a scanner and the light base. The adjusting device is operated according to the user's requirement to change the relative position between the light base and the chassis, so that the light tube mounted on the light base may be adjacent to or away from the line to be scanned on the document to be scanned. Thus, the purpose of adjusting the lightness accepted by the line to be scanned on the document to be scanned can be achieved.

The adjusting device includes a pair of opposite electromagnetic members. The relative distance between the light base and the chassis may be changed by using the attractive or repellent action of the electromagnetic force.

The adjusting device includes an electromagnetic member and a magnetic material such as an iron, co-operating with a swing arm having an elastic property and mounted between the light base and the chassis. Thus, the electromagnetic member attracts the magnetic material, so that the light base is adjacent to the chassis. When the electromagnetic member is not acted (without magnetic force), the swing arm may push the light base away from the chassis. Thus, the purpose of changing the relative distance between the light base and the chassis can be achieved.

The adjusting device may be a cam whose circumferential curvature may be changed to push the light base, thereby changing the relative distance between the light base and the chassis.

The adjusting device may include other mechanic members, for example, worm wheels co-operating with worms, or linking lever mechanism, thereby adjusting the horizontal position or vertical height of the light base.

Further benefits and advantages of the invention will become apparent after a careful reading of the detailed description with appropriate reference to the accompanying drawings.

DETAILED DESCRIPTION OF THE INVENTION

Figure 1:
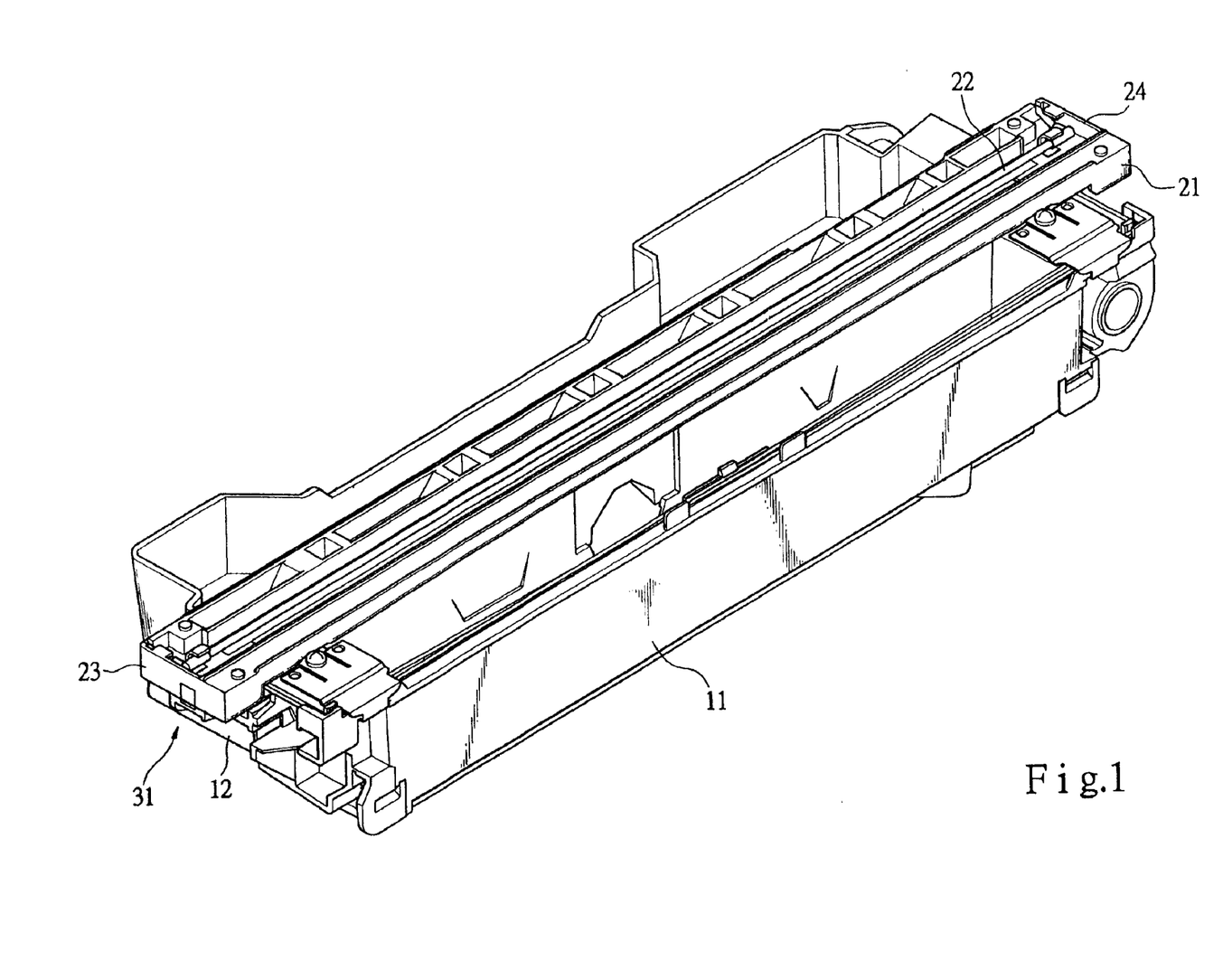
FIG. 1 is a pictorial view showing the structure in accordance with one embodiment of the invention.
Figure 3:
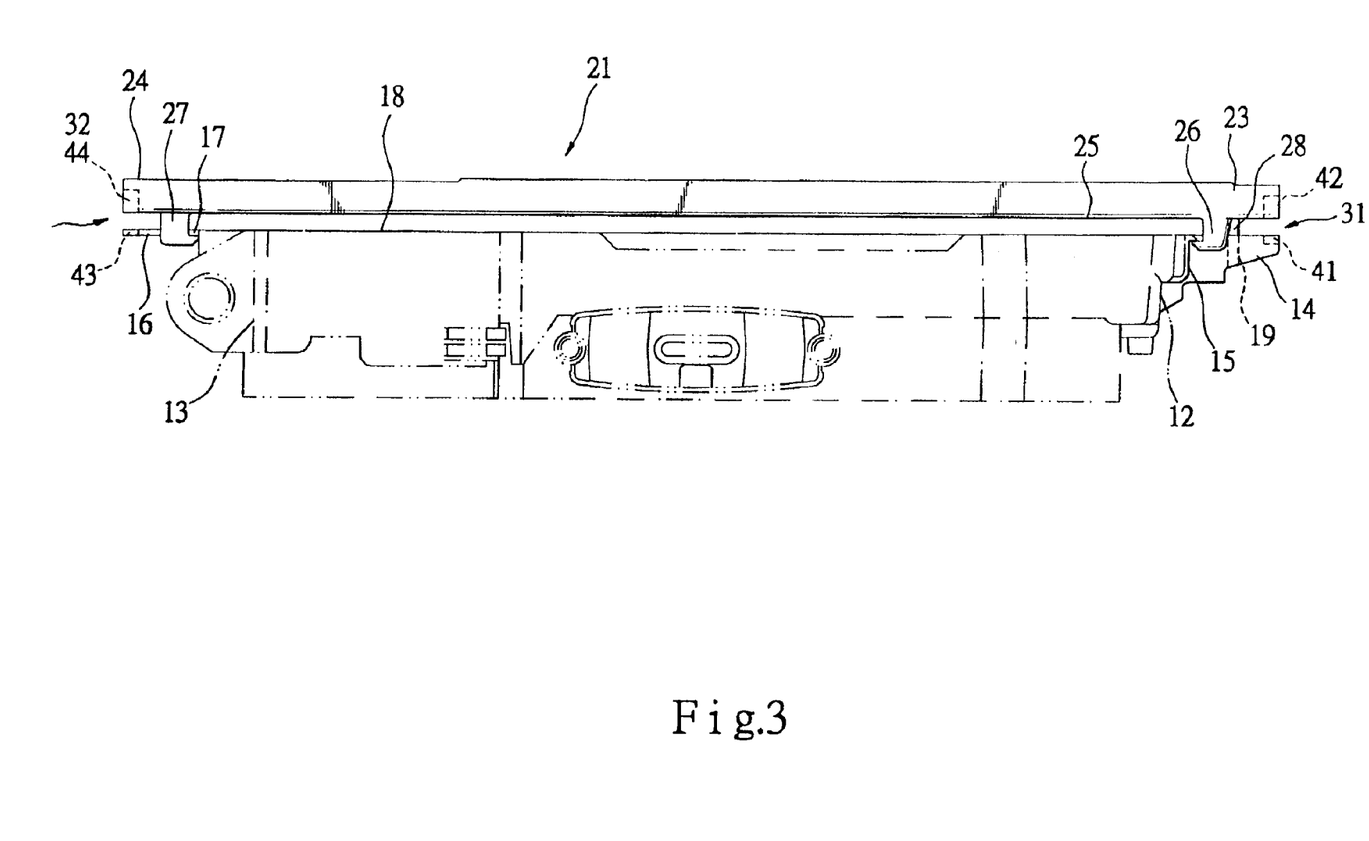
FIG. 3 is a schematic front view showing the structure of the invention.

Referring to FIGS. 1 and 3, the invention includes a light base 21 mounted above a chassis 11, and the light base 21 is provided with a light tube 22. An adjusting device 31 is mounted between the first end 12 of the chassis 11 and the first end 23 of the light base 21, and another adjusting device 32 is mounted between the second end 13 of the chassis 11 and the second end 24 of the light base 21. The adjusting devices 31 and 32 mounted on the two ends of the chassis 11 and the light base 21 may have the same component and the same operation state.

Figure 2:
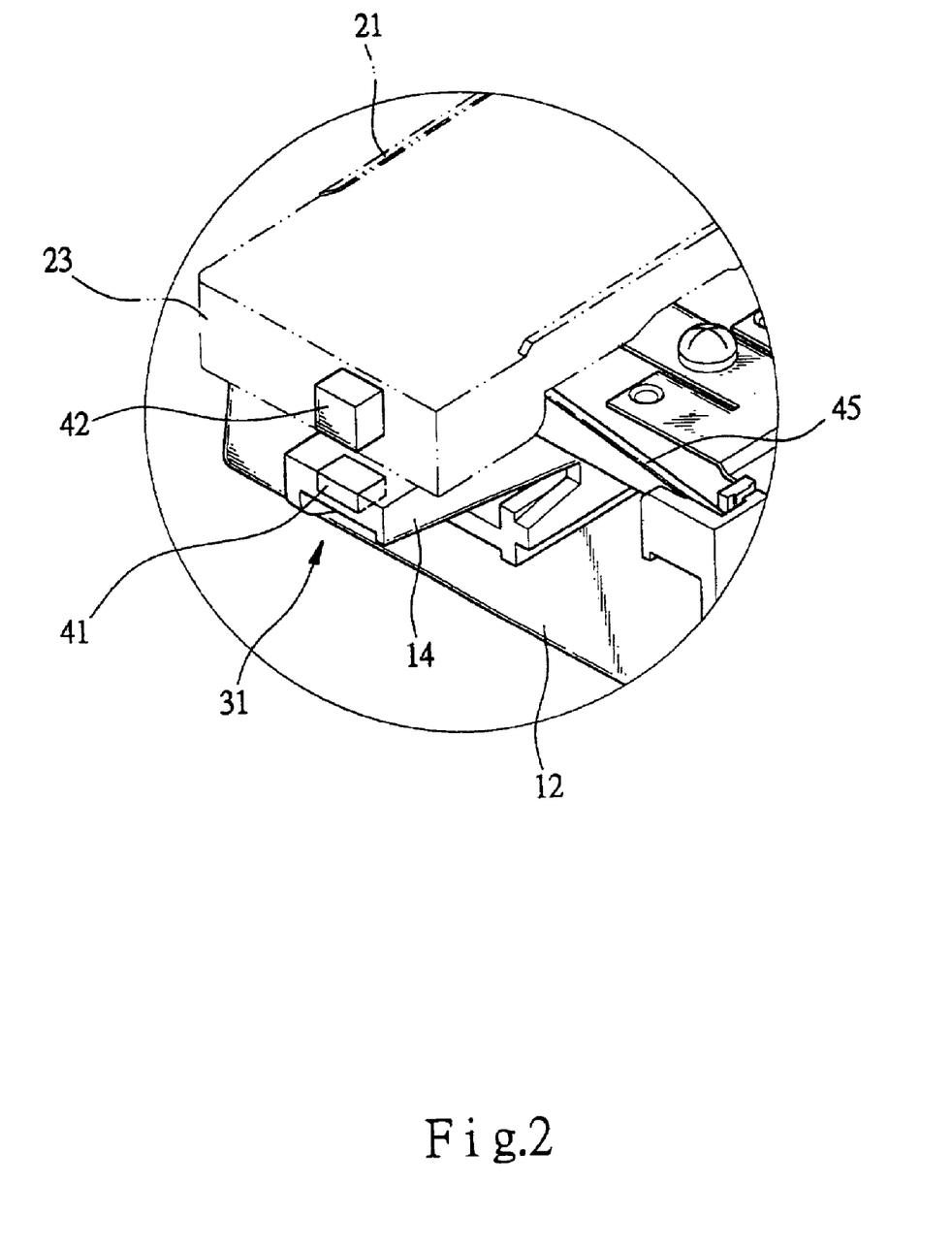
FIG. 2 is partial pictorial view showing the structure of the invention.

Further, referring to FIGS. 2 and 3, the first end 12 of the chassis 11 may includes a lug 14 which is under the first end 23 of the light base 21. The adjusting device 31 is mounted on the lug 14 and the first end 23 of the light base 21. The adjusting device 31 includes two electromagnetic members 41 and 42 having a magnetic effect. One electromagnetic member 41 is mounted on the lug 14, and the other electromagnetic member 42 is mounted on the first end 23 of the light base 21. The two electromagnetic members 41 and 42 mate with each other. The two electromagnetic members 41 and 42 generate magnetic effect by introducing an electric current. By means of changing the direction of the electric current passing through the electromagnetic members 41 and 42, the opposite end faces of the two electromagnetic members 41 and 42 produce an attractive force or a repellent force. In addition, the first end 12 of the chassis 11 includes a locking hook 15, and the bottom face 25 of the light base 21 also includes a locking hook 26 adjacent to the first end 23. The locking hooks 15 and 26 mate with each other, and form a locking state at the end positions.

The second end 13 of the chassis 11 may include a lug 16 opposite to the second end 24 of the light base 21. The adjusting device 32 is mounted on the lug 16 and the second end 24 of the light base 21. The adjusting device 32 includes two electromagnetic members 43 and 44 having a magnetic effect. One electromagnetic member 43 is mounted on the lug 16, and the other electromagnetic member 44 is mounted on the second end 24 of the light base 21. The two electromagnetic members 43 and 44 mate with each other. The two electromagnetic members 43 and 44 may generate magnetic effect by introducing an electric current. By means of changing the direction of the electric current passing through the electromagnetic members 43 and 44, the opposite end faces of the two electromagnetic members 43 and 44 may produce an attractive force or a repellent force.

In addition, the bottom of the second end 24 of the light base 21 includes a locking hook 27 which mates with the wall edge 17 of the top face 18 of the chassis 11. Thus, the end of the locking hook 27 is locked on the wall edge 17, thereby forming a locking state. Except the locking state of the locking hook 27 with the wall edge 17, the second end 13 of the chassis 11 may include another locking hook (not shown) to mate with the locking hook 27 on the light base 21, thereby forming a locking state therebetween.

The lug 14 is formed with a guide hole 19, and the light base 21 includes a guide column 28. The guide column 28 is mounted in the guide hole 19, thereby preventing the light base 21 freely wobbling on the horizontal face.

Figure 4:
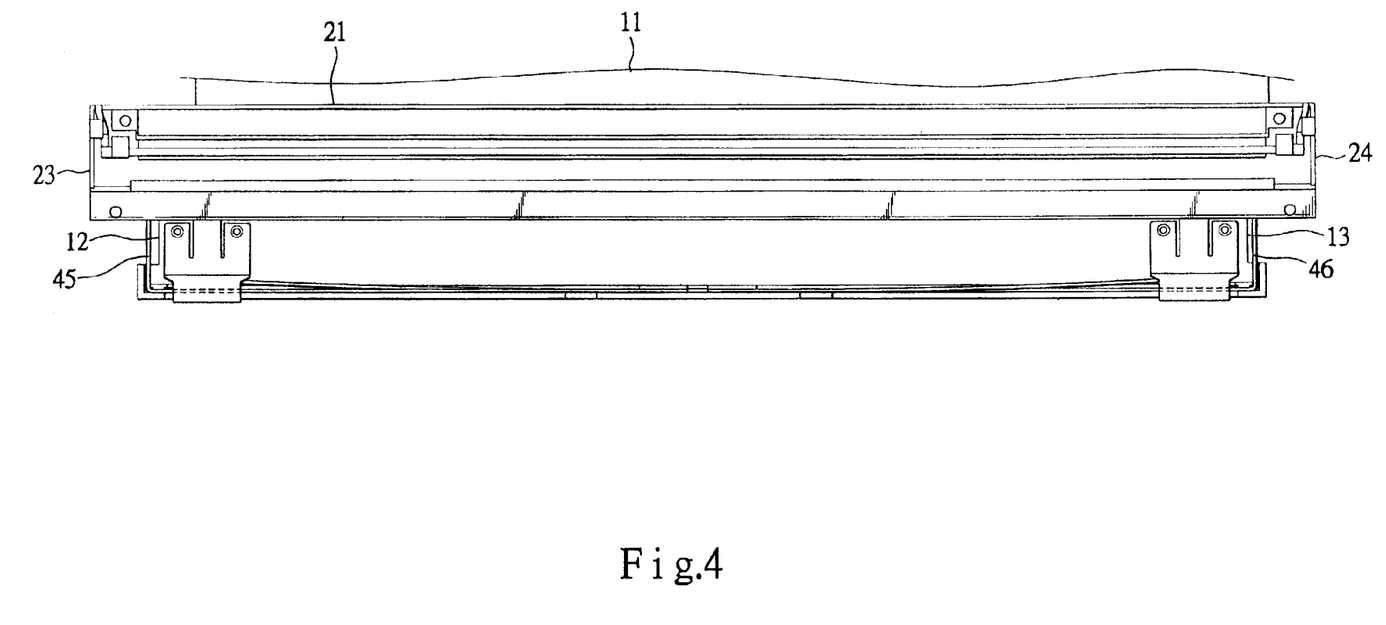
FIG. 4 is a schematic top view showing the structure of the invention.

Further, referring to FIGS. 2 and 4, a swing arm 45 is mounted between the first end 12 of the chassis 11 and the first end 23 of the light base 21, and has an elastic force for pushing the light base 21 upward. Another swing arm 46 is mounted between the second end 13 of the chassis 11 and the second end 24 of the light base 21, and has an elastic force for pushing the light base 21 upward.

The adjusting devices 31 and 32 mounted on the two ends of the chassis 11 and the two ends of the light base 21 have the same structure and manner of operation. Thus, only the manner of operation of one adjusting device 31 is illustrated.

Figure 5:
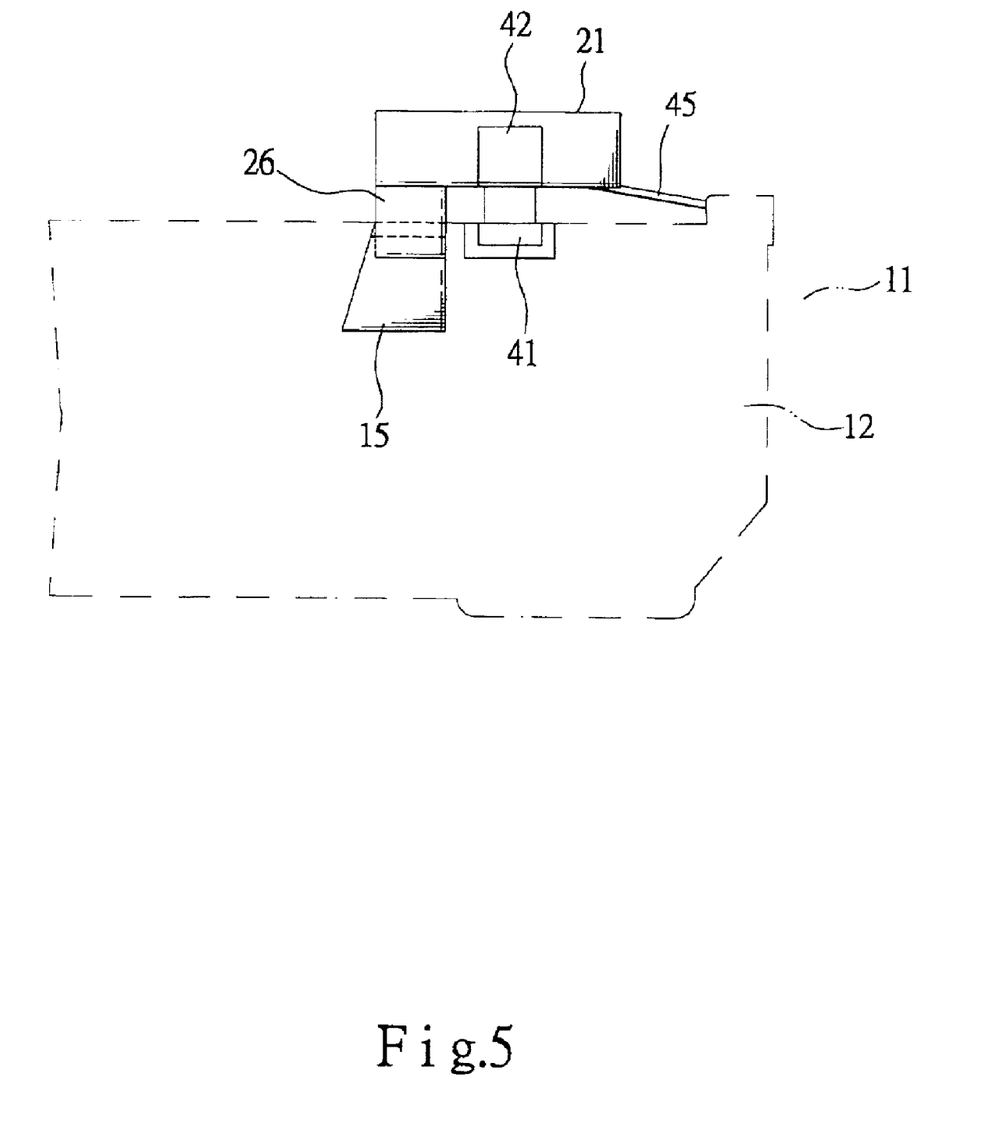
FIG. 5 is a partial schematic illustration showing the structure of the invention.
Figure 11:
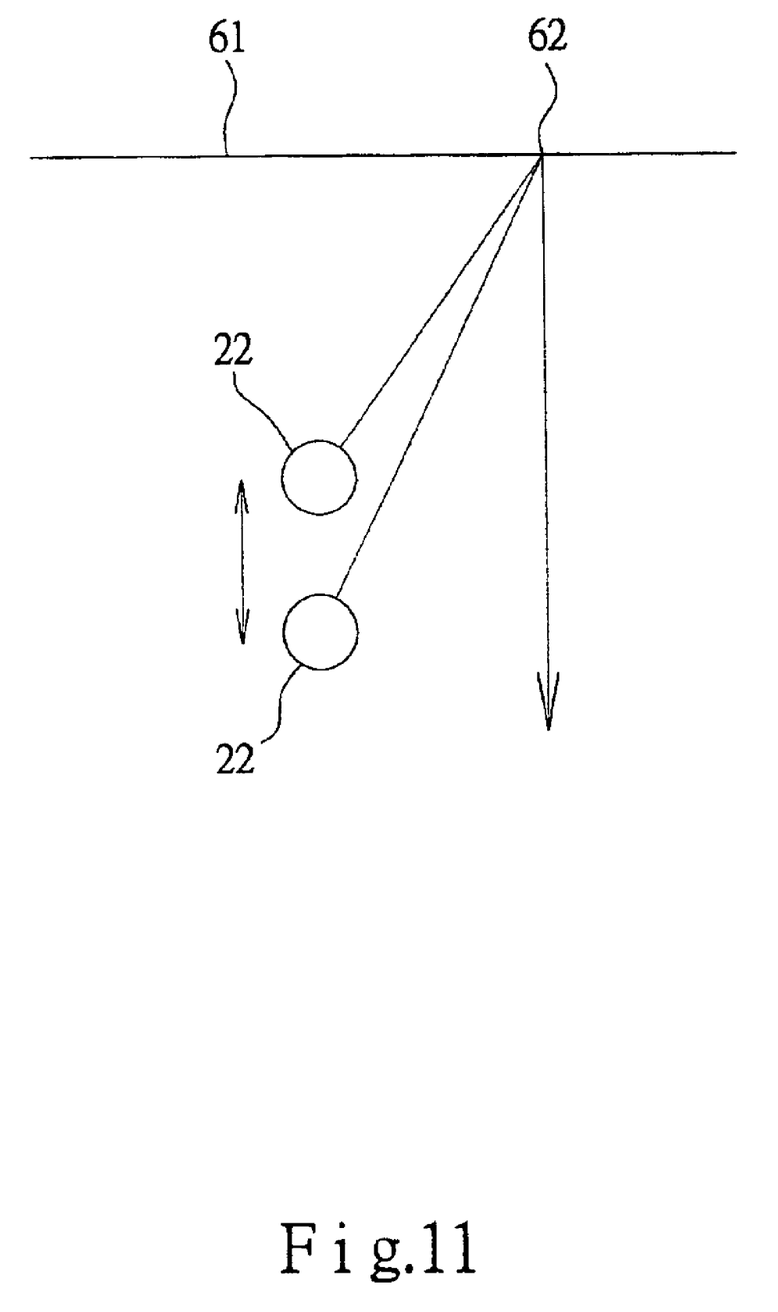
FIG. 11 is a schematic view of the invention, showing the light tube being displaced vertically to adjust the relative distance with the line to be scanned.

When proceeding scanning action of low resolution or picture of single color, the consideration of saturation of CCD is comparatively little. Thus, higher lightness may be used to proceed scanning action. Referring to FIGS. 5 and 11, the two electromagnetic members 41 and 42 are not energized, so that the two electromagnetic members 41 and 42 have no magnetic action. The light base 21 is away from the chassis 11 by elastic action of the swing arm 45. The two opposite locking hooks 26 and 15 are disposed at a locking state, thereby efficiently preventing detachment of the light base 21, and the light base 21 is fixed at the higher position. At this time, the light tube 22 is adjacent to the document 61 to be scanned. Thus, the lightness of the line 62 to be scanned on the document 61 to be scanned can be increased apparently, thereby satisfying the requirement of a quick scanning of the low resolution or the picture of single color.

Figure 6:
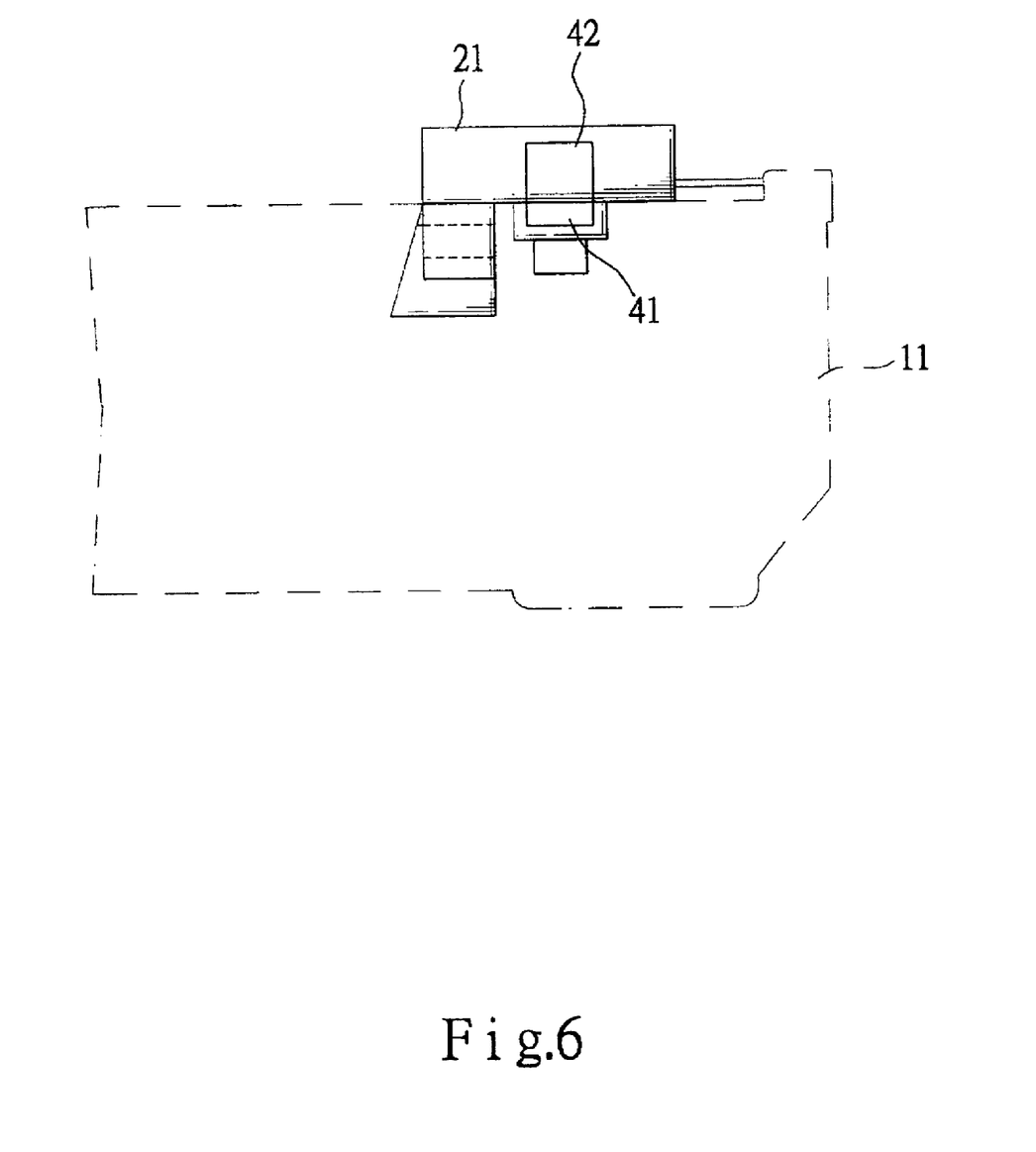
FIG. 6 is a state schematic view of the invention, showing the light base being adjacent to the chassis.

When proceeding scanning action of high resolution or picture of multiple colors, referring now to FIGS. 6 and 11, the two electromagnetic members 41 and 42 may be energized, and the opposite end faces of the two electromagnetic members 41 and 42 may form opposite poles. Thus, the light base 21 is adjacent to the chassis 11 by the attractive action of the magnetic force, so that the distance between the light tube 22 and the document 61 to be scanned is increased. Thus, the lightness of the line 62 to be scanned on the document 61 to be scanned can be decreased. During the scanning action of low lightness for a long period of time, the requirement of the high resolution or the picture of multiple colors will be satisfied.

The height of the light base 21 can be adjusted by the adjusting device 31. Namely, the relative distance between the light tube 22 and the line 62 to be scanned on the document 61 to be scanned can be adjusted. Proper lightness will be obtained to satisfy the requirement of scanning. What is more important is, during adjusting the height, the light tube 22 of the light base 21 always retain a stable lightness. Thus, the light tube 22 will not blink due to additional signals, thereby increasing the lifetime of the light tube 22.

The adjusting device 31 includes two electromagnetic members 41 and 42. Thus, by changing the direction of the electric current passing through the electromagnetic members 41 and 42, the two electromagnetic members 41 and 42 may produce an attractive force or a repellent force. When the repellent action is produced, the light base 21 is away from the chassis 11. The guide column 28 on the light base 21 is mounted in the lug 14 of the chassis 11, and the locking hook 26 of the light base 21 is locked with the locking hook 15 of the chassis 11. Thus, the light base 21 can be stably positioned at a higher position without the swing arm 45.

In another design, the electromagnetic member 42 of the adjusting device 31 is replaced by a magnetic material such as an iron. Thus, when the electromagnetic member 41 is energized, it will attract the magnetic material, so that the light base 21 is adjacent to the chassis 11. When not energized, the light base 21 may be lifted to a higher position by the swing arm 45.

Figure 7:
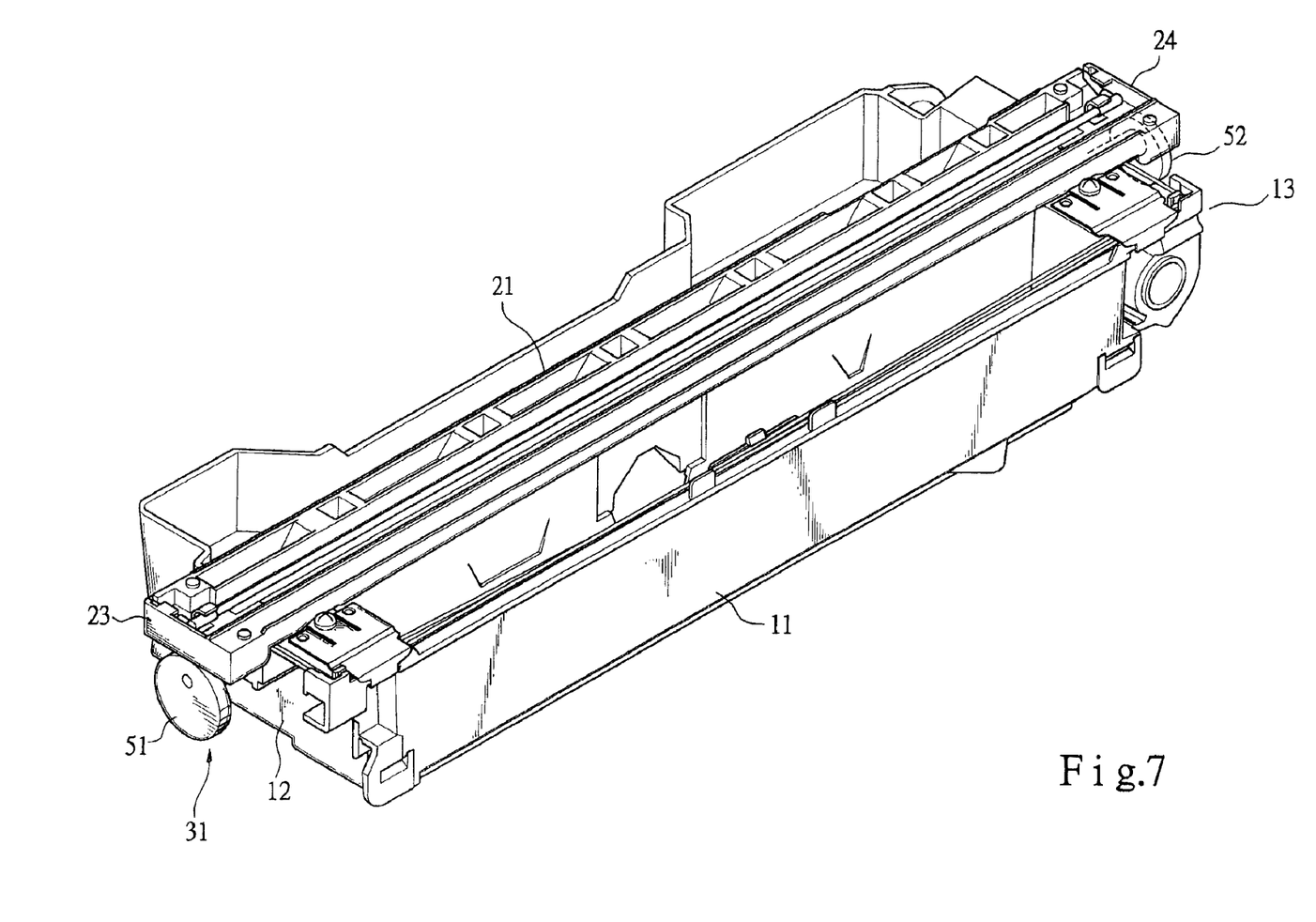
FIG. 7 is a pictorial view showing the structure in accordance with another embodiment of the invention.
Figure 8:
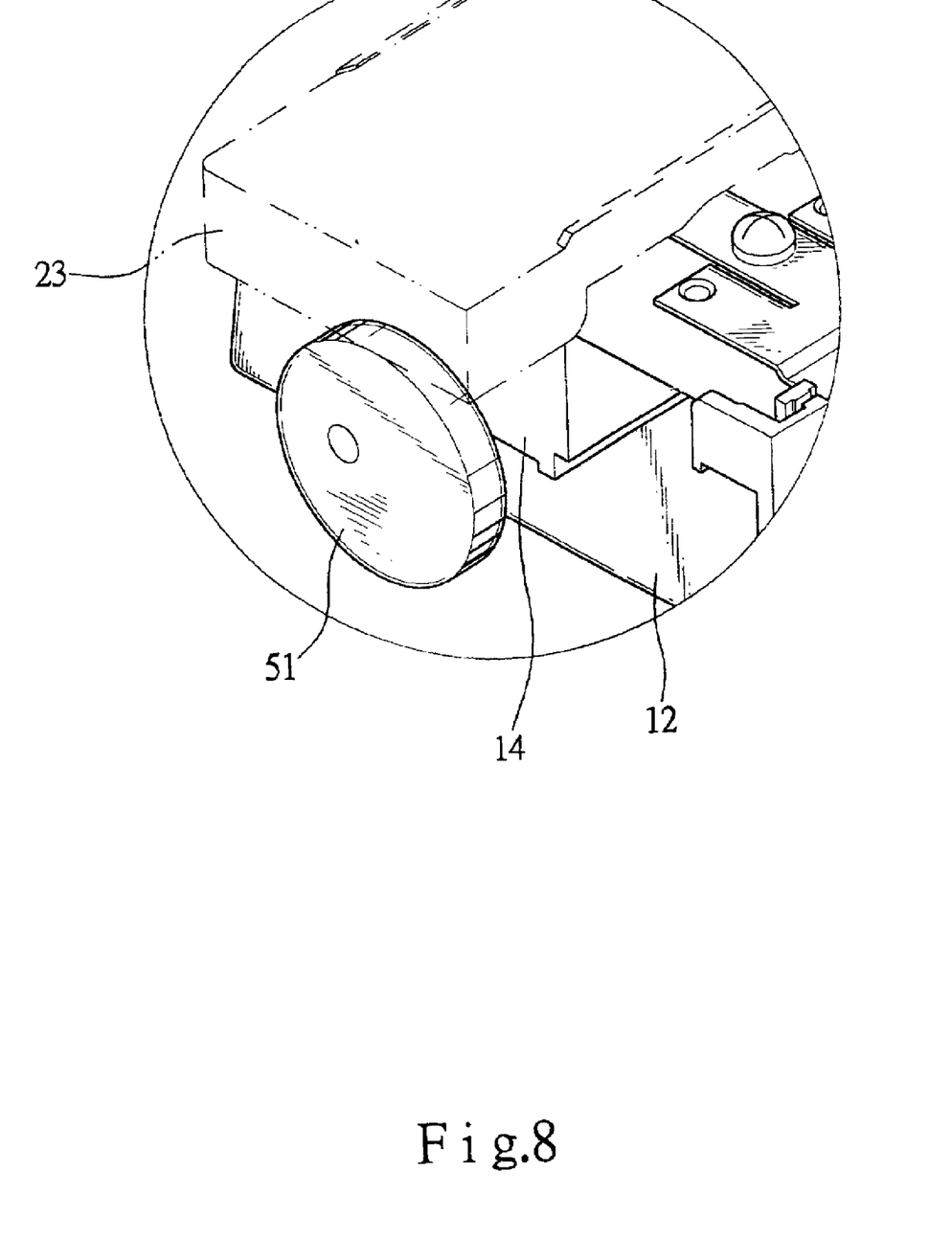
FIG. 8 is a partial pictorial view showing the structure in accordance with another embodiment of the invention.

Except the structure of the adjusting device 31 which includes two electromagnetic members 41 and 42 co-operating with a swing arm 45, another equivalent structure is shown in FIGS. 7 and 8, a cam 51 is mounted between 11 the first end 12 of the chassis 11 and the first end 23 of the light base 21, and another cam 52 is mounted between the second end 13 of the chassis 11 and the second end 24 of the light base 21. The two cams 51 and 52 may be eccentric circles or have specific profile curve. The two cams 51 and 52 have the same structure.

Figure 9:
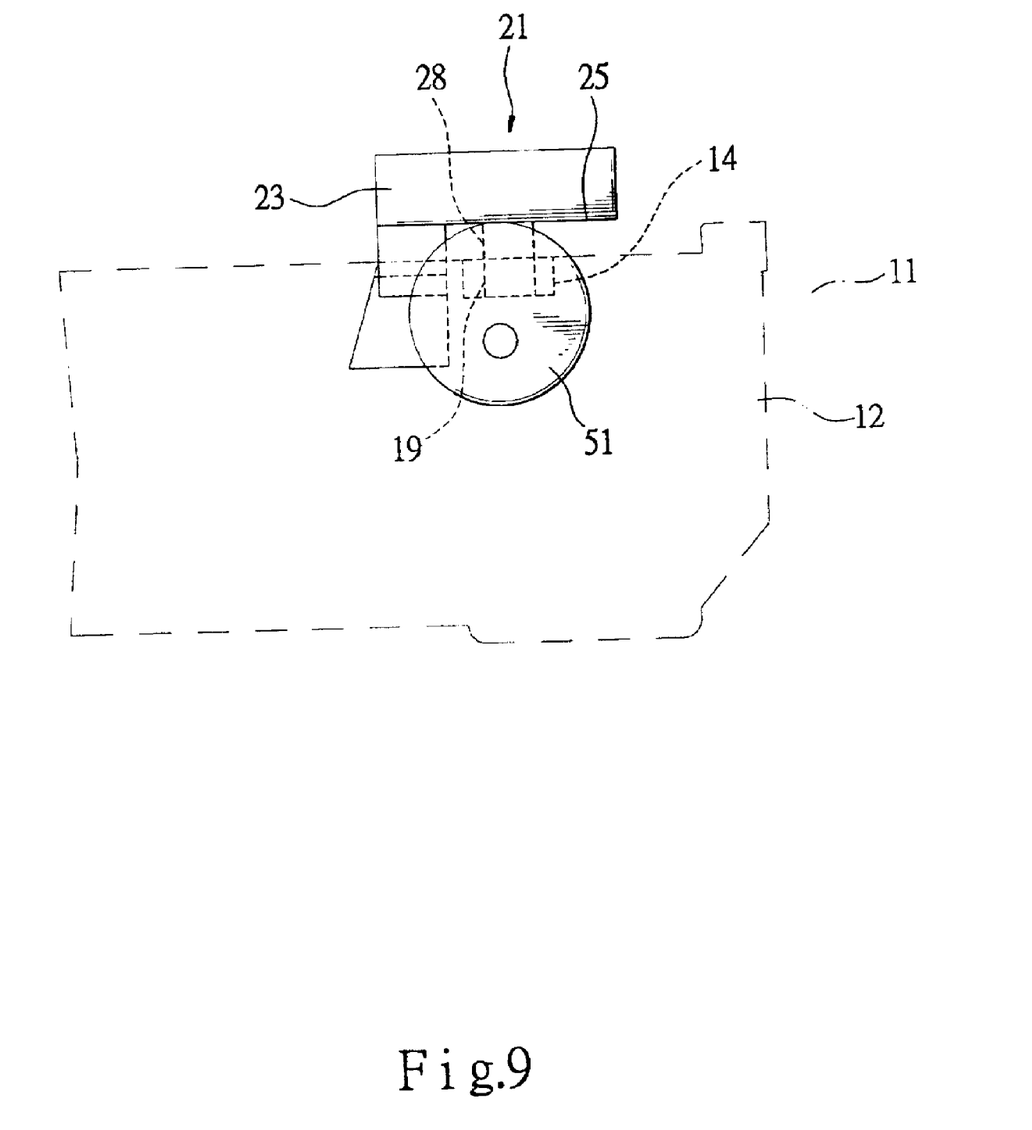
FIG. 9 is a partial pictorial view showing the structure in accordance with another embodiment of the invention.
Figure 10:
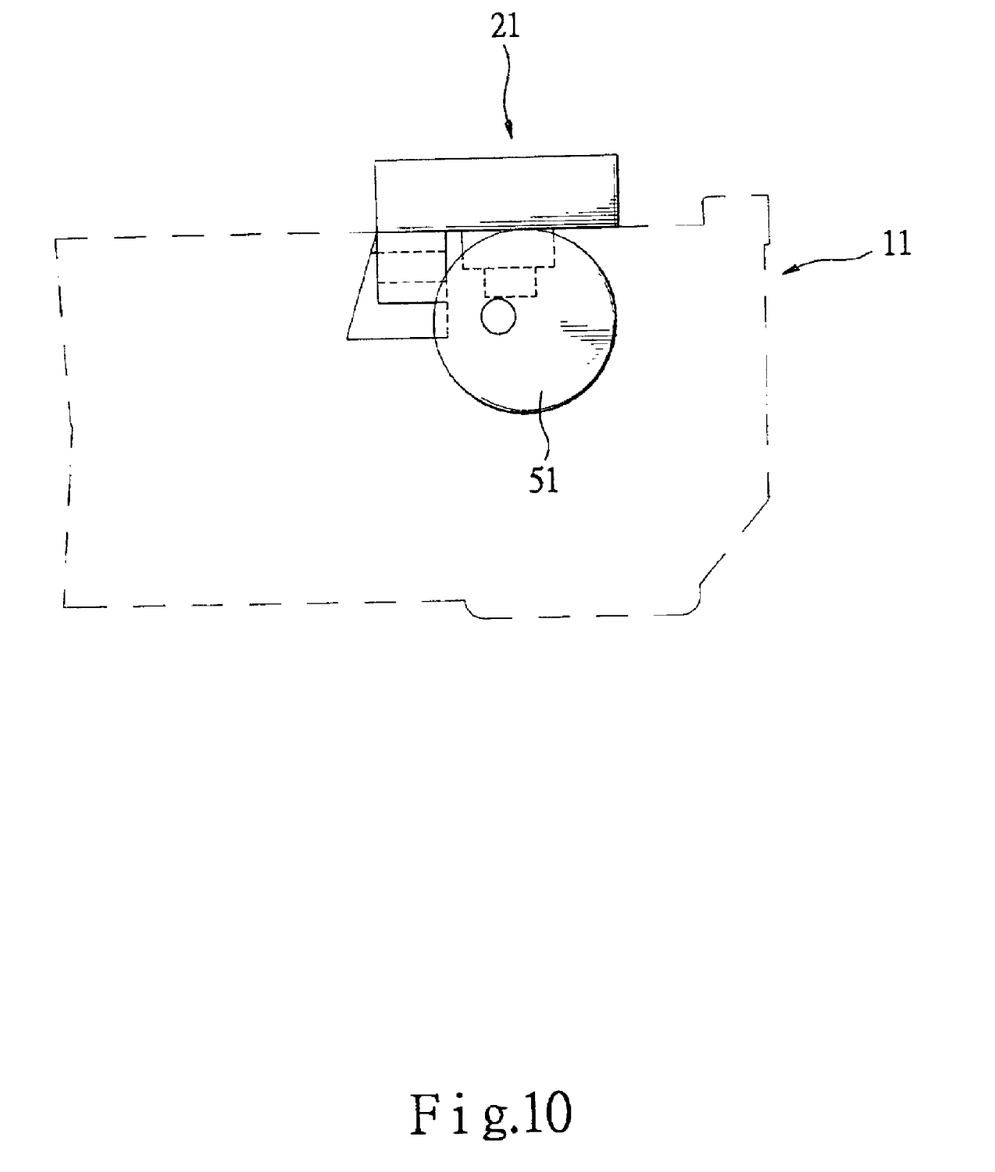
FIG. 10 is a state schematic view of another embodiment of the invention, showing the light base being adjacent to the chassis.

Referring to FIGS. 8 and 9, the first end 12 of the chassis 11 is provided with a lug 14, and the lug 14 is provided with a guide hole 19. A guide column 28 is mounted on the bottom face 25 of the light base 21 adjacent to the first end 23, and the guide column 28 is mounted in the guide hole 19. Thus, the light base 21 and the chassis 11 will not wobble in the horizontal direction due to limit of the guide column 28 and the guide hole 19. When the cam 51 is rotated, the light base 21 is displaced upward to be away from the chassis 11 and adjacent to the document 61 to be scanned. Thus, the document 61 to be scanned has a higher lightness, thereby satisfying the scanning requirement of scanning of the low resolution or the black and white scanning. Referring to FIG. 10, when the cam 51 is rotated, the light base 21 is displaced downward associated with its own weight to be adjacent to the chassis 11. Thus, the document 61 to be scanned has a lower lightness, thereby satisfying the scanning requirement of scanning of the high resolution or the picture of multiple colors.

Under the condition of the light tube 22 providing a stable and constant lightness, the cams 51 and 52 designed as the adjusting devices 31 and 32, may also adjust the light base 21 by mechanic elements, to achieve the purpose of changing the lightness of the document. In addition, the mechanic adjusting devices 31 and 32 of the invention may be constituted by co-operation of worm wheels and worms, or by linking lever mechanism, or by equivalent elements.

Further, instead of two adjusting devices, there may only one adjusting device. At this time, the adjusting device and the spring or swing arm having elasticity and mounted on the center of the light base may also achieve the effect of adjusting the lightness of the light received by the document.

Figure 12:
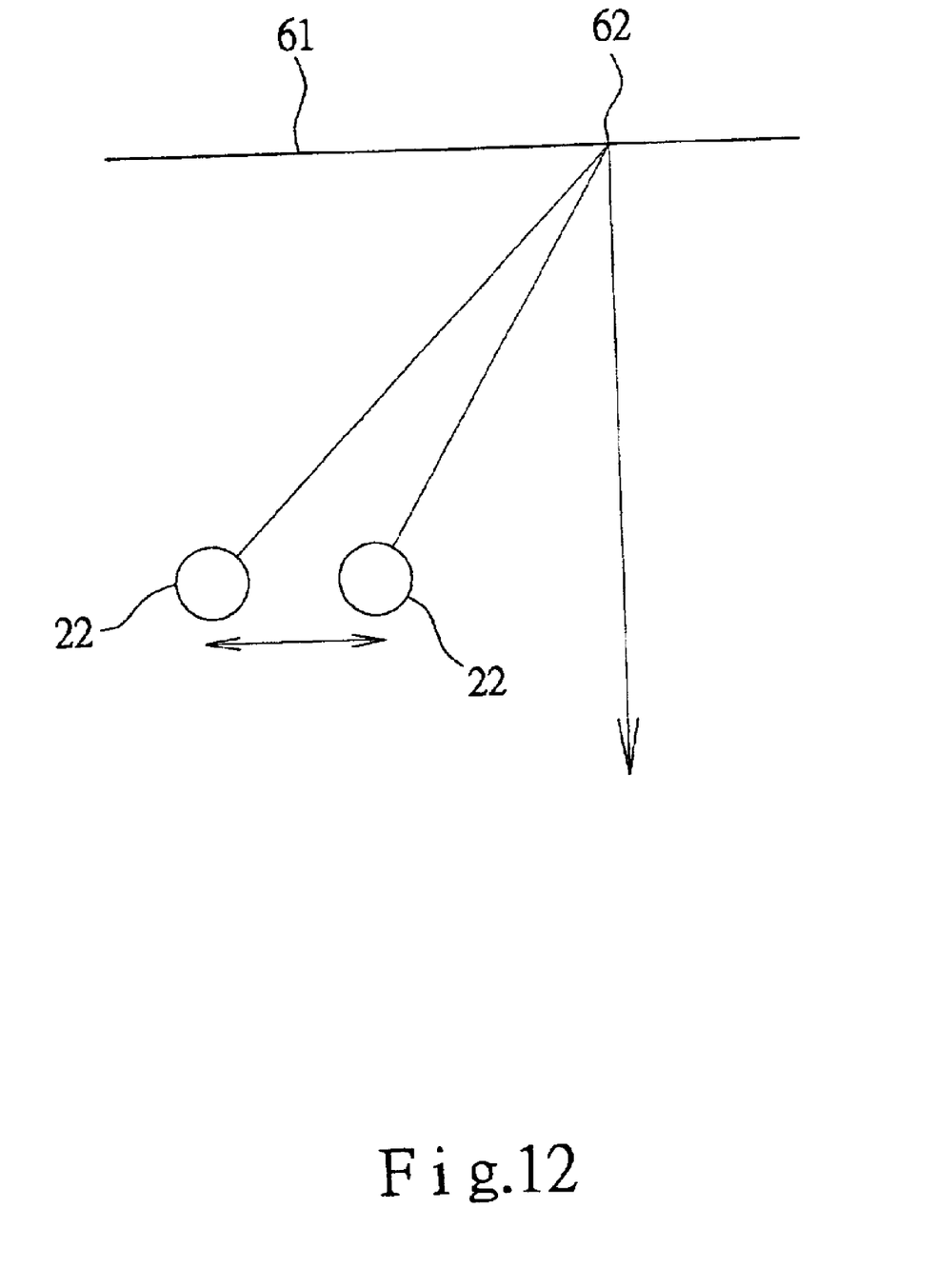
FIG. 12 is a schematic view of the invention, showing the light tube being displaced horizontally to adjust the relative distance with the line to be scanned.

The invention may adjust the height of the light base 21, to adjust the relative distance between the light tube 22 and the line 62 to be scanned on the document 61 to be scanned, so that the document 61 to be scanned has a proper lightness. Except for adjusting the height of the light base 21, the horizontal position of the light base 21 can also be adjusted. Referring to FIG. 12, the position of the light tube 22 is changed accordingly. For the line 62 to be scanned on the document 61 to be scanned at the same position, the light tube 22 at different horizontal positions has different values of lightness due to different travel of the light. Thus, the purpose of adjusting lightness of the line 62 to be scanned can be achieved.

While the preferred embodiment of the invention has been shown and described, it will be apparent to those skilled in the art that various modifications may be made in the embodiment without departing from the spirit of the invention. Such modifications are all within the scope of the invention.

What is claimed is:

1. A structure of a scanner capable or adjusting lightness of a line to be scanned, comprising:

a chassis;

a light base on which a light tube is mounted, the light base being mounted above the chassis; and at least one adjusting device mounted between the chassis and the light base for driving the light base to change a relative distance between the light tube and a line to be scanned on a document to be scanned;

wherein the adjusting device includes at least one electromagnetic member.

2. The structure of a scanner capable of adjusting lightness of a line to be scanned in accordance with claim 1, wherein the adjusting device includes two opposite electromagnetic members respectively mounted on the light base and the chassis, by changing the direction of the current passing through the relative electromagnetic members, the opposite electromagnetic members produce an attractive force or a repellent force, such that the light base is adjacent to or away from the chassis.

3. The structure of a scanner capable of adjusting lightness of a line to be scanned in accordance with claim 1, wherein the adjusting device includes two electromagnetic members co-operating with a swing arm having an elastic action, wherein the electromagnetic members are respectively mounted on the light base and the chassis, and the swing arm has one end mounted on the chassis, and the other end mounted on the light base.

4. The structure of a scanner capable of adjusting lightness of a line to be scanned in accordance with claim 1, wherein the adjusting device includes an electromagnetic member and a magnetic material, co-operating with a swing arm having an elastic action, wherein the electromagnetic member and the magnetic material are respectively mounted on the light base and the chassis, and the swing arm has one end mounted on the chassis, and the other end mounted on the light base.

5. The structure of a scanner capable of adjusting lightness of a line to be scanned in accordance with claim 1, wherein the chassis and the light base are respectively provided with a guide column and a guide hole, and the guide column is mounted in the guide hole.

6. The structure of a scanner capable of adjusting lightness of a line to be scanned in accordance with claim 1, wherein the chassis and the light base are respectively provided with a locking hook, and the locking hooks may be relatively locked with each other to limit detachment of the light base.

* * * * *